United States Patent [19]
Winter et al.

[11] Patent Number: 5,778,414
[45] Date of Patent: Jul. 7, 1998

[54] PERFORMANCE ENHANCING MEMORY INTERLEAVER FOR DATA FRAME PROCESSING

[75] Inventors: Stephen J. Winter, Sunrise; Jack E. Stephenson, Davie, both of Fla.

[73] Assignee: Racal-Datacom, Inc., Sunrise, Fla.

[21] Appl. No.: 663,562

[22] Filed: Jun. 13, 1996

[51] Int. Cl.[6] .................................................. G06F 12/02
[52] U.S. Cl. ............................ 711/5; 711/3; 711/101; 711/118; 711/202; 711/205; 711/206
[58] Field of Search ................................ 395/405, 403, 395/445, 428, 412, 411, 415, 417; 370/389, 428, 465, 469, 903; 711/3, 5, 118, 101, 202, 205, 206

[56] References Cited

U.S. PATENT DOCUMENTS 5,398,245  3/1995  Harriman, Jr. .................. 370/94.1

OTHER PUBLICATIONS

W. Stallings, *Computer Organization and Architecture*, 4th Ed., pp. 121-147.

*Primary Examiner*—Tod R. Swann
*Assistant Examiner*—T. V. Nguyen
*Attorney, Agent, or Firm*—William A. Newton

[57] ABSTRACT

Disclosed is a frame processing engine for receiving and processing a data frame having a header and a payload, comprising a first memory for receiving at least a portion of the header of the data frame; a second memory for receiving the payload of the data frame; and a controller, upon receipt of the data frame, for storing the header (at least most of it) in the first memory and the remainder of the data frame (including the payload) in the second memory, with the first memory having a shorter access time than the second memory.

21 Claims, 9 Drawing Sheets

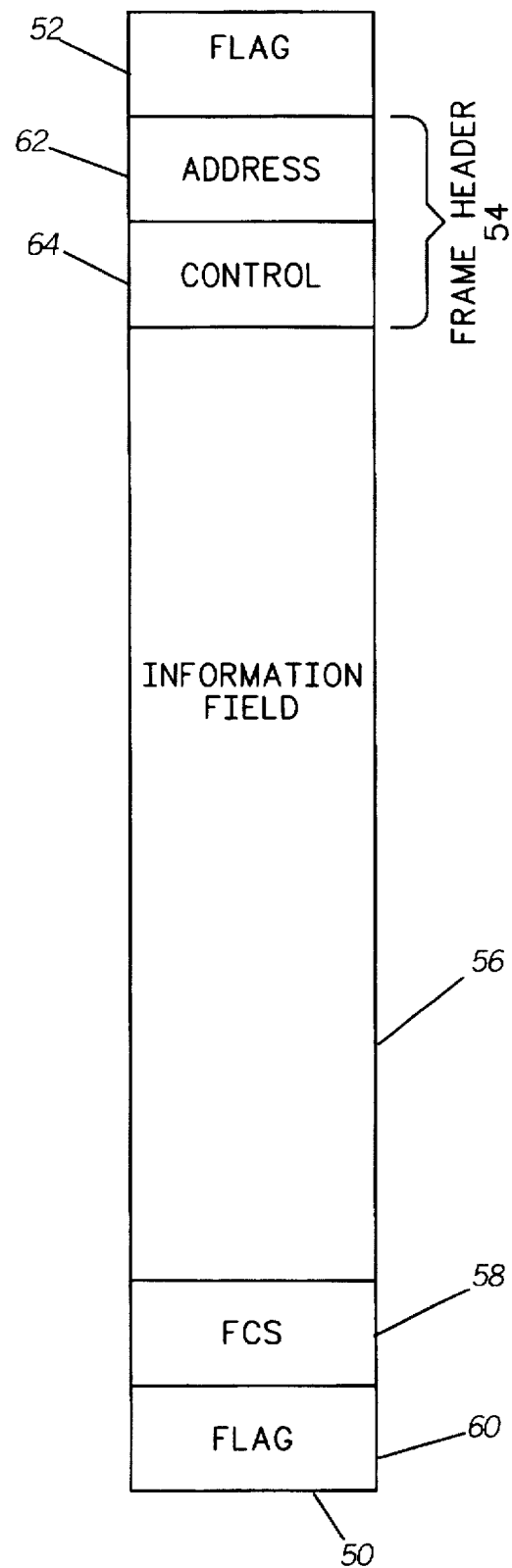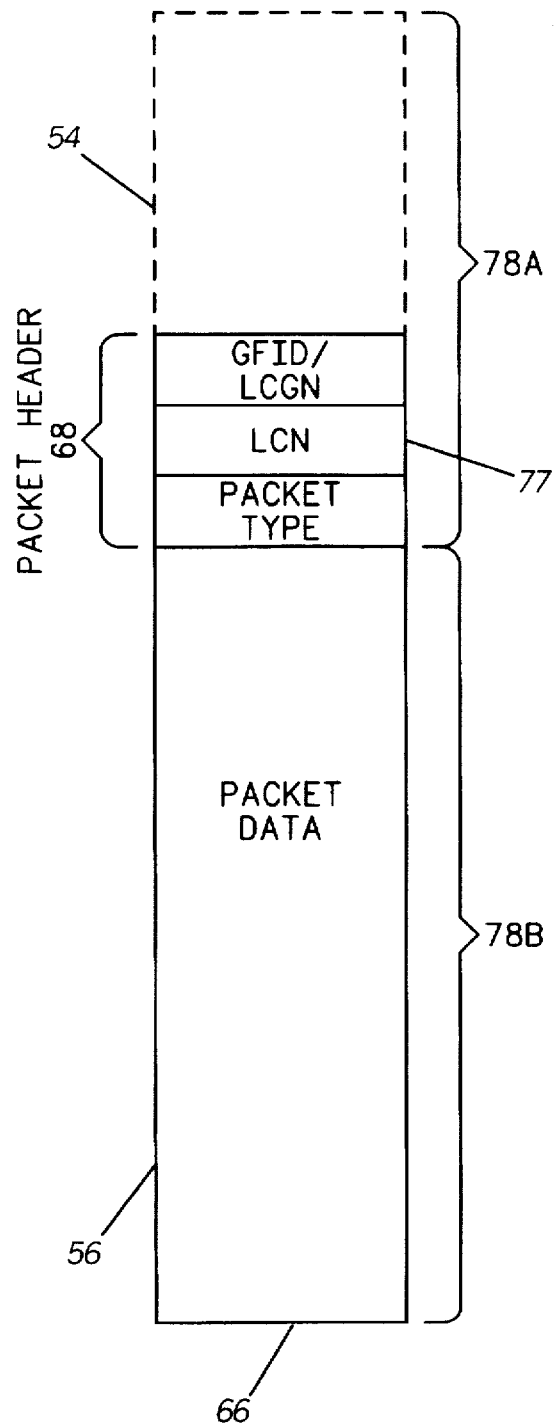
FIG.2
FIG.3

PERFORMANCE ENHANCING MEMORY INTERLEAVER FOR DATA FRAME PROCESSING

BACKGROUND

1. Field of the Invention

This invention relates to buffer memories for data packets or frames in a frame processing engine.

2. Background of the Invention

In a packet or frame processing device, frames of data are typically received and processed through many layers of protocol software and then transmitted as a transformed frame or frames or packets towards a destination. The frames include at least a frame header that is initially part of the frame (at the front of it) and an information field, i.e., payload. The frames themselves can be long in relationship to: (i) the number of bytes required to hold the frame header information or (ii) the number of bytes required to hold the transformed frame header information as the frame is processed through the multiple layers of protocol software.

The frame processing engine of the frame processing device, in processing frames through multiples layer of protocol software, accesses the frame header information of a frame many times. In contrast the remainder of the frame in memory, which will be referred to as the payload, does not typically need to be read from or written to by the frame processing engine during this time.

The performance of a frame processing device, for a large part, is dependent on how long it takes to process frames through multiple layers of protocol software. This typically involves accessing the frame header information. A much smaller part of the performance of a frame processing devices is dependent on moving the frame into the frame memory, and then moving it, out after the frame's header information is processed by the multiple layers of protocol software.

SUMMARY OF THE INVENTION

The present invention is directed toward a frame processing engine for receiving and processing a data frame having a header and a payload. The frame processing engine includes a first memory for receiving at least a part of the header of the data frame; a second memory for receiving the payload of the data frame; and controller means, upon receipt of the data frame, for allocating the header (at least most of it) to the first memory and the payload to the second memory. The first memory has a shorter access time than the second memory.

By having the header of a data frame reside in the faster memory, and the payload of the data frame reside in slower memory, there is only a small decrease in performance from an all fast memory device as compared to a much larger decrease in performance when going from an all fast memory device to an all slow memory device.

In an interleave-by-decode embodiment, hardware is used to interleave different physical memory devices into a contiguous area in the memory map. In an interleave-by-pointer embodiment, address pointers are used to point to different blocks of the first and second memories.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWINGS

FIG. 2 shows an illustrative data frame processed by the frame processing engine of the present invention.

FIG. 3 shows an illustrative information field for the data frame of FIG. 2 comprising a X.25 data packet.

DETAILED DESCRIPTION OF THE PREFERRED EMBODIMENT

Figure 1:
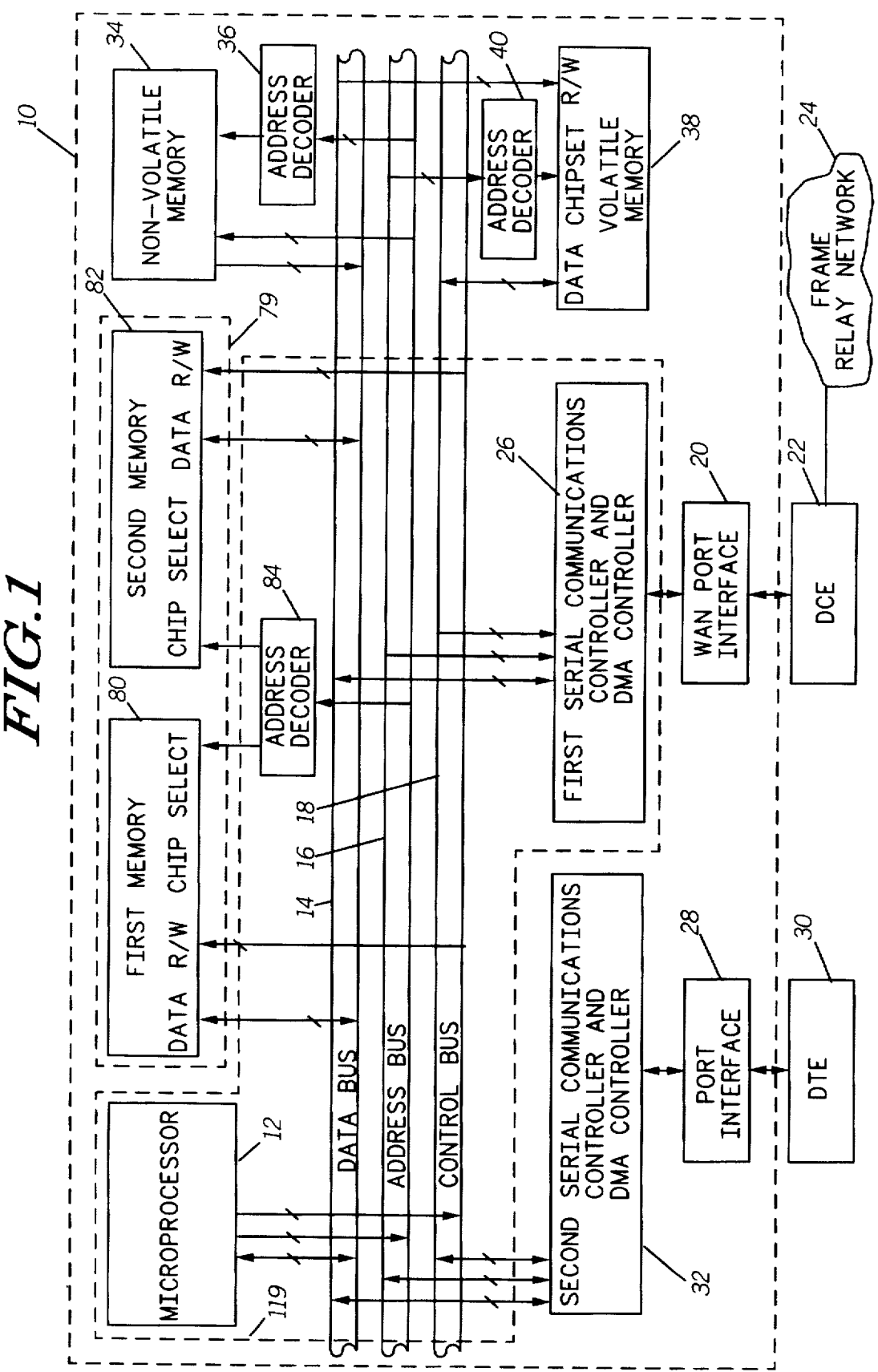
FIG. 1 is a block diagram of the frame processing engine of the present invention coupled to a frame relay network and data terminal equipment.

Referring to FIG. 1, a frame processing engine 10, incorporating the present: invention, is shown. The invention is illustrated in a frame relay environment, although the frame processing engine 10 of the present invention may also be used to receive other types of data frames.

FIG. 1 provides an overview block diagram of the hardware for the frame processing engine 10. In a conventional manner, a 32 bit microprocessor 12 (e.g., Motorola MC68ECO40) is connected to a data bus 14, an address bus 16, and a control bus 18. The three busses 14, 16 and 18 define a conventional system bus. The frame processing engine 10 includes a wide area network (WAN) port interface 20 for connecting to data communications equipment (DCE) 22, such as a modem, digital service unit (DSU), or T1-CSU. The DCE 22 in turn is connected to a wide area network, which in the preferred embodiment would be a frame relay network 24. Hence, the engine 10 would receive and provide frames having a frame structure for frame relay (described hereinafter) via this port interface 20. The WAN port interface 20 is connected to a first serial communications controller (SCC) and DMA controller 26, which in turn is connected to the data bus 14, address bus 16 and control bus 18.

Another port interface 28 of the engine 10 connects to data terminal equipment (DTE) 30, which, depending on the specific usage of the engine 10, could comprise a number of possibilities, such as a terminal or local area network. Hence, this port interface 28 is used to pass data frames to and from the DTE 30. The port interface 28 is connected to a second serial communications controller (SCC) and direct memory access (DMA) controller 32, which in turn is connected to the data bus 14, address bus 16 and control bus 18.

A conventional non-volatile memory 34 is provided, which comprises FLASH memory in the preferred embodiment. In a conventional manner, the memory 34 is used to hold the program code and interfaces with the bus buses 14 and 18 and interfaces through address decoder 36 to bus 16. Additionally, conventional volatile memory 38 is provided, which comprises dynamic RAM in the preferred embodiment. This volatile memory is a non-frame/non-buffer memory which is used for stack and other variable memory requirements. The memory 38 interfaces with buses 14 and 18 and with bus 16 via an address decoder 40, all in a conventional manner. A frame buffer memory, which is the subject of the present invention, will be described hereinafter.

As mentioned above, data frames are provided to and from the port interface 20. Referring to FIG. 2, a conventional data frame 50 for frame relay is illustrated. This data frame 50 is standardized with a LAPD frame format, which includes a first flag 52, a frame header 54, an information field 56, a frame check sequence ("FCS") 58 and a second flag 60. The frame header 54 includes an address portion 62 consisting of a Data Link Connector Identifier ("DLCI") and a control portion 64. The address portion 62 is used by frame relay protocols to identify the source and destination for the data frames. These frame relay protocols comprise the physical layer and part of the data link layer of Open Systems Interconnection ("OSI") model. The frame header 54 may also be extended in order to increase the total available address space. The LAPD frame structure, e.g., fields, of the data frame 50 is defined by the ITU Q.922 (Annex A) Standard.

Figure 4:
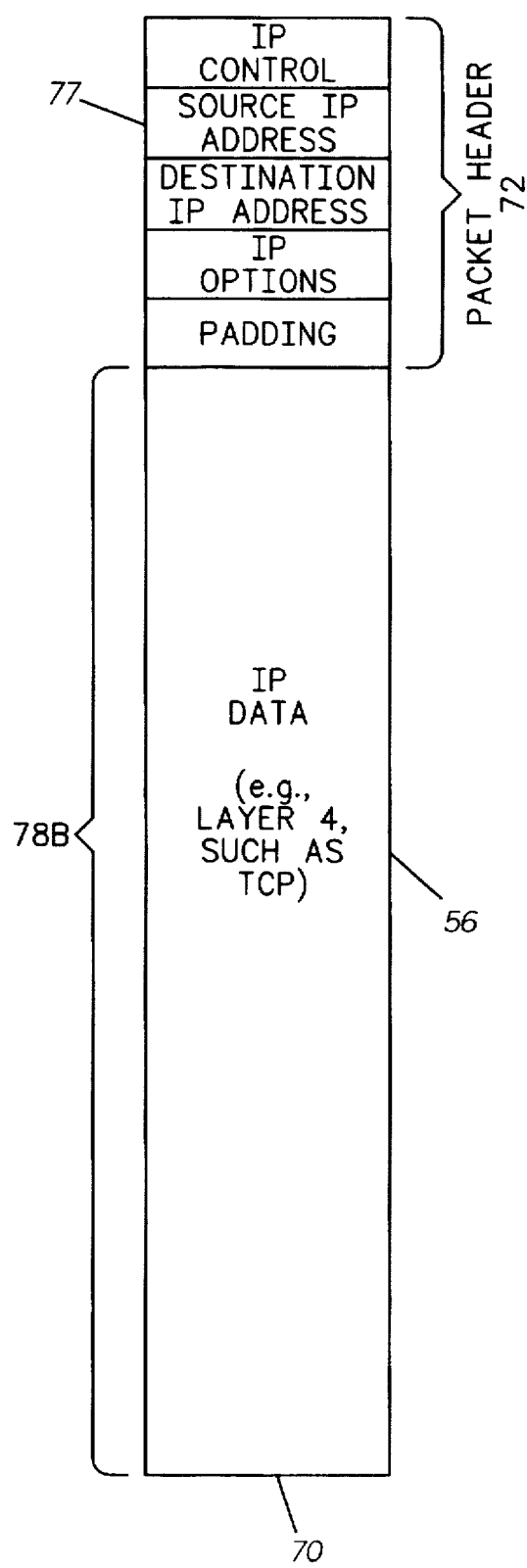
FIG. 4 shows an illustrative information field for the data frame of FIG. 2 comprising an IP data packet.
Figure 5:
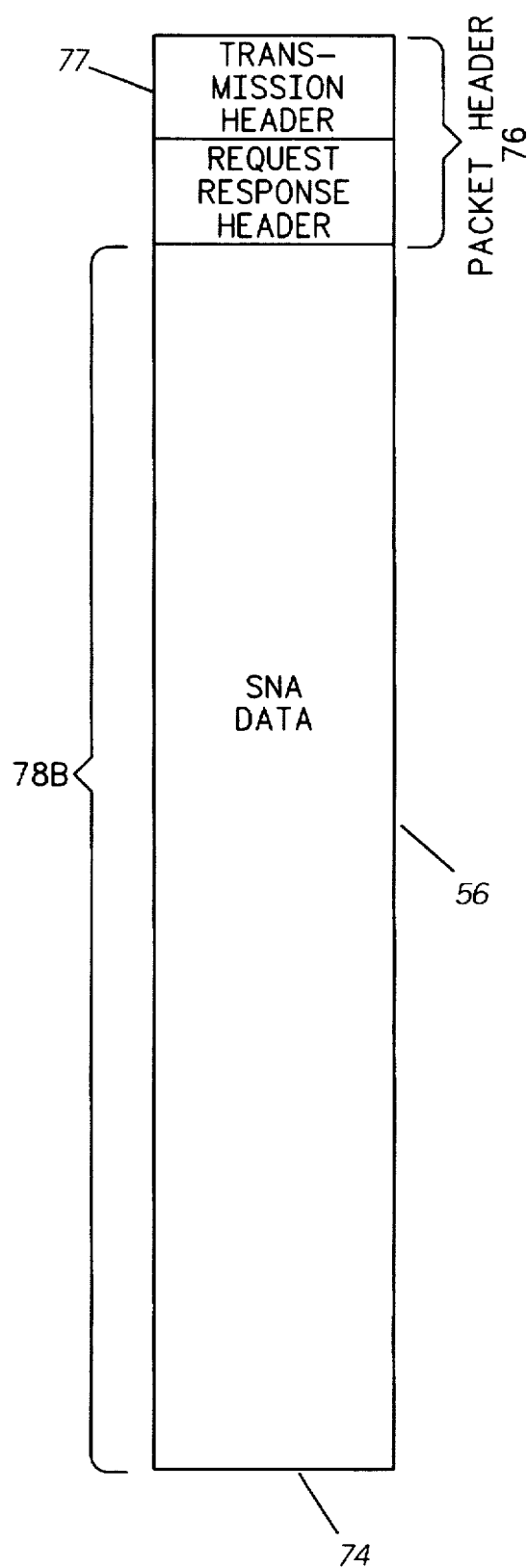
FIG. 5 shows an illustrative information field for the data frame of FIG. 2 comprising an SNA/SDLC data packet.

Referring to FIG. 2, the information field 56 of frame 50 typically (but not always) includes one of several possible types of well known encapsulated data packets for various communication protocols, e.g., X.25, SNA/SDLC, or IP (LAN bridge). Three illustrative types of encapsulated data packets shown in FIGS. 3, 4 and 5 are illustrative of some of the well known possibilities. More specifically, the information field 56 of data frame 50 of FIG. 3 illustrates an X.25 data packet 66 with a packet header 68. The information field 56 of FIG. 4 illustrates an IP data packet 70 with a packet header 72. The information field of FIG. 5 illustrates a SNA/SDLC data packet 74 with a packet header 76. Hence, the frame 50 not only has a frame header 54, but also typically includes an encapsulated packet header. The three encapsulated packet headers and like headers are generically identified by the numeral 77. Other encapsulated protocols are known to those skilled in the art. Moreover, with some received frames 50, the information field may not have a packet header 77 and merely have data. In the claims and this specification, when the term "header" or "header information" is used, it is intended to generically cover: 1) a frame header 54 or 2) a packet header 77 or 3) a combination of both the frame header 54 and packet header 77. Hence, to illustrate one of these possibilities, the header 78A is shown in FIG. 3 as including frame header 54 (shown in dashed lines) and packet header 77. Additionally, the data frame 50 is defined to include the data or payload 78B, which includes all the information field 56 except for the packet headers 77. Hence, each data frame 50 is; defined to include a header 78A and a payload 78B.

With respect to FIG. 1, the data frames 50 are received from the WAN port interface 20, such frames originating from the frame relay network 24. In a conventional manner, the controller 26 receives each data frame 50 in the form of a serial bit stream. Working in the physical layer of the International Standards Organization ("OSI"), the first flag 52 of the data frame 50 is detected and peeled off by the controller 26. Next, the various protocol layers contained in the frame header 54 and the packet header 77 are processed to the extent needed for a given application, in effect by moving up and down the protocol stack of OSI. For the processing of the frame header 54, the frame processing engine 10 may, for example, examine the address 62. As the result of this examination, the frame header 54 may be modified to include LAN information if the frame 50 is to be sent out to data terminal equipment ("DTE") 30 comprising a LAN.

The above description of the frame processing engine 10 is of a conventional, well known design, such as exists in the assignee's commercialized frame relay access ("FRAD") product, identified by the trademark EAN 4200.

The improvement in the frame processing engine 10 of the present invention is directed toward an enhanced semiconductor memory arrangement for a frame buffer memory 79 of the engine 10. Referring to FIG. 1, the frame memory 79 includes a first memory 80 and a second memory 82, both of which are directly (however, those skilled in the art will recognize that these memories 80 and 82 could be indirectly coupled via buffers) coupled to the data bus 14 and the control bus 18. The first and second memories 80 and 82 are connected to the address bus 16 via an address decoder logic 84. The first memory 80 comprises a faster access, more expensive semiconductor memory relative to the second memory 82. In the preferred embodiment of FIG. 1, the first memory 80 comprises a static memory and the second memory 82 comprises a dynamic RAM memory. For example, in the preferred embodiment, the first memory 80 uses 64k×16 RAM memory chips, manufactured by Samsung (KM6161002A-15) (15 ns) and the second memory 82 uses 1M×16 DRAM memory chips, manufactured by Samsung (KM416C1200A) (70 ns).

Although the preferred embodiment of the frame memory 79 of the present invention provides for the semiconductor memories 80 and 82 to be static RAM and dynamic RAM respectively, there are a number of other possible combinations of faster access, more expensive semiconductor memory with slower access, less expensive semiconductor memory encompassed by the present invention. For example, depending on the application, such combinations would include: (i) faster access static RAM with slower access static RAM, (ii) faster access dynamic RAM with slower access dynamic RAM or (iii) other combinations of relatively faster and slower semiconductor memories as will be obvious to those skilled in the art.

There are two primary embodiments of the present invention that allow for the interleaving of fast and slow memory, the first being identified as "interleave-by-decode" and the second being identified as "interleave-by-pointer".

Interleave-by-decode Embodiment

Figure 6:
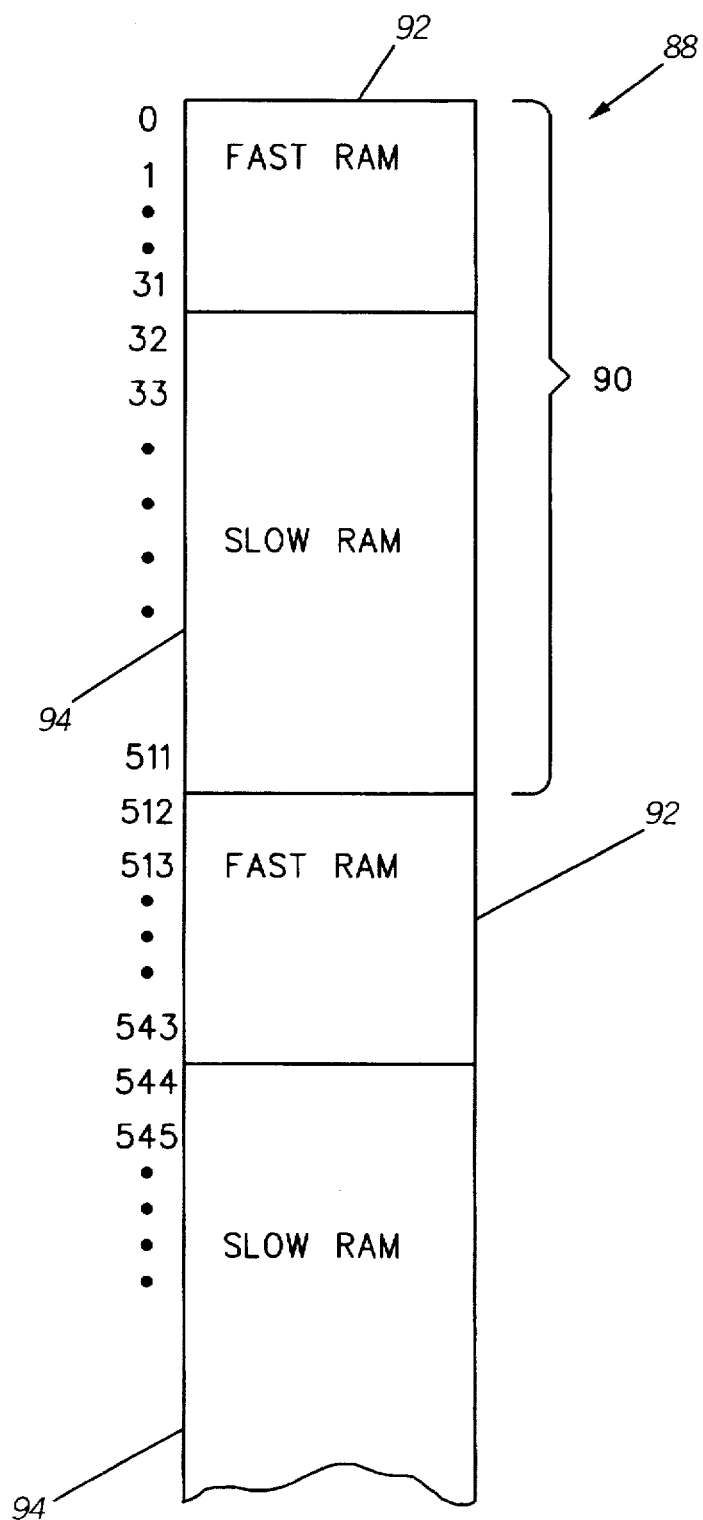
FIG. 6 shows a simplified portion of a memory map of the frame buffers used in the frame processing engine of the interleave-by-decode embodiment of the present invention.

The first embodiment of the present invention allocates the frame memory 79 using the technique referred to as "interleave-by-decode". Referring to FIG. 6, there is illustrated a memory map 88 for the microprocessor 12 shown in FIG. 1 for this first embodiment. This memory map 88 illustrates how the microprocessor's linear address space is allocated so that the information in a given data frame 50 is divided and stored part in the first memory 80 and part in the second memory 82. More specifically, this memory map 88 includes a linear progression of memory addresses beginning with "0", with each memory address shown in FIG. 6 being the address of a memory location in either the first or second memories 80 and 82. The first 512 addresses of the memory map 88 define a first memory segment 90, such segment comprising a 512 bytes of memory. This first memory segment 90 includes: (i) a fast RAM memory block 92 of 32 bytes of the first memory 80 [defined by addresses 0 through 31] and (ii) a slow RAM memory block 94 of 480 bytes of the second memory 82 [defined by addresses 32 through 511].

It will be obvious to those skilled in the art that the sizing of the segment 90 is a matter of design choice which is dependent upon the application for the frame processing engine. For frame relay applications, in addition to the 512 byte segment 90, a 256 byte segment 90 has been found acceptable. The size of the segment 90 was chosen based upon a tradeoff between amount of memory wasted (increases with larger memory blocks) and processing overhead needed to handle a data frame made up of multiple memory blocks (increases with smaller memory blocks). The size of the memory blocks are defined by the size of the segments 90.

The linear progression of addresses of memory map 88 define a plurality of such memory segments 90, each starting with one of the fast RAM memory blocks 92 and ending with one of the slow RAM memory blocks 94. This leads to alternating memory blocks 92 and 94. Although only two memory segments 90 are shown in FIG. 6 (the second one only partially shown), in the preferred embodiment with one Mbyte of buffer memory, there are 4000 memory segments 90. However, it will be appreciated by those skilled in the art that the actual number of memory segments 90 and their sizing are a matter of design preference dependent upon a specific application.

As discussed with respect to FIG. 6, each the fast RAM memory block 92 comprises 32 bytes of the faster, more expensive first memory 80 shown in FIG. 1. The fast RAM blocks 92 are the memory areas in the frame memory 79 where header (or most of such header) of the data frame would reside when the data frame is first received by and stored in the frame memory 79 of FIG. 1. In the interleave-by-decode embodiment, there are two considerations that affect the sizing of these fast RAM blocks 92:

First, the sizing of the fast RAM block 92 is intended to include most or all of the header of the data frame. However, not all of the header information needs to be consistently included. In fact, since the lengths of such headers may vary, e.g. depending on type of encapsulated data packet, it is believed that the optimum compromise is to include, on average, about 90–95% of the header.

Second, the sizing must also accommodate any additional number of bytes of the fast RAM memory block 92 needed by each layer of protocol software to perform transformations on such headers. This means that each fast RAM memory block 92 should be designed to be larger than that size needed to receive the header (or a part of the header, as the case may be) received by the fast RAM memory block 92, with free bytes at the front for header being available for transformations.

As previously described, the memory map 88 of FIG. 6 comprises a linear address space, as seen by the microprocessor 12 of the packet engine 10 of FIG. 1, which includes addresses of smaller chunks of faster first memory 80 interleaved with the addresses for relatively larger and slower chunks of the second memory 82. This interleaving of memory is accomplished with the logics of the address decoder 84 of FIG. 1 for the fast and slow memories 80 and 82, respectively. This address decoder 84 will be described in detail hereinafter with respect to FIG. 8. Themeeory map 88 of FIG. 6 was simplified in that it shows only that portion of the map 88 needed to understand the present invention as it relates to the first and second memories 80 and 82. An expanded version of memory map 88 is shown in FIG. 7.

Figure 7:
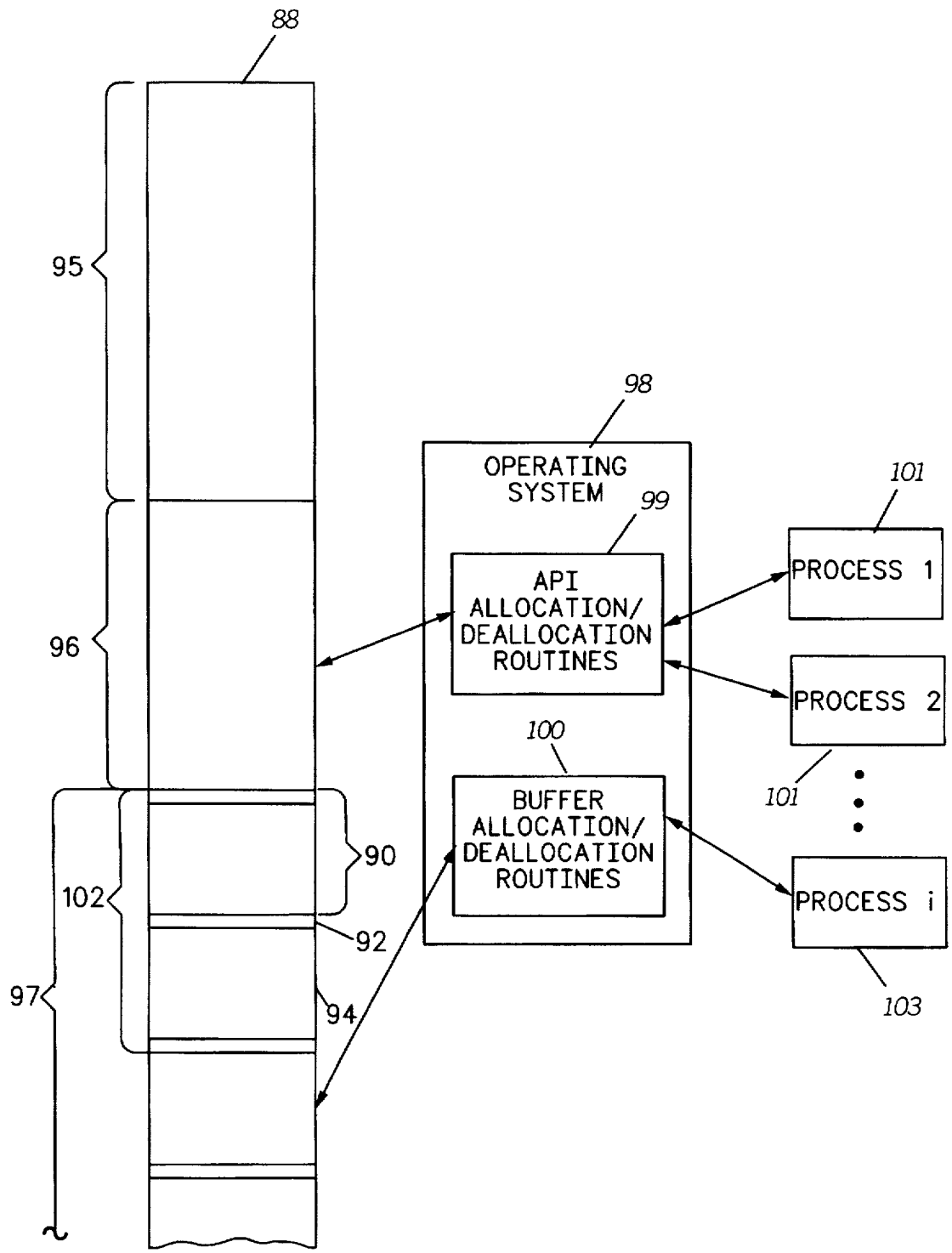
FIG. 7 shows how the operating system for the interleave-by-decode embodiment allocates/deallocates memory.

Referring to FIG. 7, the memory map 88 has a conventional first map portion 95 which assigns addresses to various memory devices. The memory map 88 further includes a second and third map portions 96 and 97 comprising the addresses that define a first and second pools of memory, respectively. In the previous discussion of FIG. 6, the addresses of third map portion 97 have already been defined to correlate with locations in the first and second memories 80 and 82. In a conventional manner, the addresses of the first and second map portions 95 and 96 correlate with locations in the non-volatile memory 34 and the volatile memory 38.

Referring to FIG. 7, the microprocessor 12 includes a well known pSOS operating system 98 which comprises licensed programs from Integrated Systems, Inc. The use of this operating system 98 is conventional, except as noted below. In a conventional manner, the operating system 98 includes a memory allocation/deallocation routines 99. These routines 99 respond to requests for memory from a plurality of programs and processes 101 that are running. A plurality of such programs/processes 101 typically interact with the operating system 98; however, only two are shown in FIG. 7. The two processes 101 are illustrative of a plurality of possible general processes, which are not part of the present invention. The allocation routines 99 respond to the request by telling the program or process 101: (i) what memory has been allocated to it, i.e., the starting address and the size of such allocated memory or (ii) that its request is rejected, e.g., responds to an error message that no memory is available at this time. In a conventional manner, the routines 99 also receive deallocation requests, e.g., a program or process running under the operating system 98 sends a message indicating that it is done with the memory at a given address and having a given size. Thereafter, the operating system 98 returns this memory to the pool of memory so that some other process or program may use the returned memory. The routines 99 selects memory from the first pool of memory defined by the second map portion 96.

The conventional PSOS operating system 98, through its allocation routines 99, provides contiguous chunks of memory within the processor's memory space of at least the size required. In a conventional manner, the routines 99 works from first pool of memory defined by the second map portion 96. These routines 99 allocate memory for dynamically allocated variables. The routines 99 are general memory allocation routines which are well known for managing a pool of shared memory which is shared among the multiple processes 101 that have a dynamic need for memory. In the prior art implementation of frame processing engines, the routines 99 were also used to allocate frame buffers. However, this is not the case with the present invention. These routines 99, without modification, cannot be used for the frame buffers of the present invention because such frame buffers cannot be guaranteed to start on the boundaries of predetermined segments 90, which in turn correlate with boundaries of predetermined memory blocks.

Hence, to accommodate the present invention, this well know operating system 98 has been modified to include the buffer allocation/deallocation routines 100. One skilled in the art could modify the general allocation/deallocation routines 99 to accommodate the providing of frame buffers in accordance with present invention. However, in the preferred embodiment, separate buffer allocation/ deallocation routines 100 are added to the operating system 98 to allocate memory defined by the third map portion 97 in a manner already discussed. These routines 100 operate in the same manner as the routines 99 (as described above), except the routines 99 always provide frame buffers that start at the beginning of one of the memory segments 90, i.e., start with the beginning of one of the fast RAM memory block 92. This insures that when a program or process puts a frame into a buffer, the start of the header 78A (described in FIG. 3) will be put into fast first memory 80. More specifically, for each of the data frames 50, the above described buffer allocation routines 100 would allocate one of a plurality of frame buffers. Each of these frame buffers begin with a fast RAM memory block 92. In this way, the header information will be stored (or mostly stored) in the faster access memory.

In the above discussion, those skilled in the art will recognize that in the memory map 88 for the map portion 97, each address is correlated with a specific memory cell in the first or second memories 80 and 82. Moreover, references to blocks of addresses in the memory map 88 of FIGS. 6 and 7 define chunks of memory that exist in first and second memories 80 and 82. Hence, blocks of memory are defined by blocks of addresses in the memory map.

As will be described in detail hereinafter, there are two methods in which these frame buffers are defined for the "interleave by decode" embodiment of the present invention. In the first method the frame buffers are fixed in size (defined by a single segment) and in the second method the frame buffers are a variable length (X segments, where X≧1). The desirability of one method over the other is a function of the intended application for the frame processing engine 10. For frame relay applications, the second method is believed to be preferable.

Interleave by Decode—First Method

Referring to FIGS. 2 and 3, the first method of the "interleave by decode" technique is directed toward applications for the frame processing engine 10 where there are no significant variations in the length of the data frames 50 or variation in the size of the header 78A in comparison to the payload 78B. In this method, each frame buffer defined by the allocation routines 100 of FIG. 7 is set to equal a single memory segment 90. Hence, there is a one-to-one correspondence between frame buffers and memory segments 90.

Referring to both FIG. 6, one such setting of these memory sizes for the memory segments 90 (and therefore the frame buffer) have already been described. For this first method, the buffer allocation routines 100 of FIG. 7 allocate the first received data frame 50 to the first memory segment 90 starting with address "0" as shown in FIG. 6, which would result in most or all of the header 78A going into the first fast RAM memory 92 and most or all of the payload 78B going in-to the first slow RAM memory 94. Next, the buffer allocation routines 100 would allocate the next data frame 50 such that buffer addresses start at the beginning of the next block of fast RAM memory 92 in the next memory segment 90, i.e., beginning at address 512. In a conventional manner, the buffer routines 100 would continue to use consecutive memory segments 90 or previously used, but freed up memory segments 90. In this way, the header 78A (or most of it) is placed in faster first memory 80, with each successive data frame 50 starting at the beginning of the next memory segment 90. Hence, in this first method, there is a one-for-one correlation of data frames 50 and memory segments 90. Hence, each frame buffer consists of one of the single memory segments 90.

For purposes of simplifying the explanation of the present invention, the memory map 88 of FIG. 6 was shown as starting at address 0. However, as clearly shown in FIG. 7, the third map portion 97 is in fact the memory map 88 shown in FIG. 6. Hence, the memory map 88 of FIG. 6 (i.e., third memory map portion 97 in FIG. 7) does not begin at memory address 0 in the preferred implementation, but would start at an address that defines the beginning of the second pool of memory, as shown in FIG. 7. However, it is in the scope to the present invention to put the three map portion 95, 96 and 97 in any order and to intersperse parts of the map portions among other map portions.

Interleave by Decode—Second Method

Referring to FIG. 7, an alternative embodiment of the "interleave by decode" method is directed toward accommodating data frames of substantially varying length, that would lead to wasted memory if the above described first method was used with such frames. For this alternative "interleave by decode" method, the buffer memory allocated to a data frame may be allocated in multiple memory segments 90. In this way, a protocol that sends smaller data frames can use a smaller number of memory segments 90 (but no less than one), whereas a protocol that sends larger data frames can use a larger number of memory segments 90. The memory segments 90 allocated to a given data frame defines the frame buffer for that data frame. For example, the two segments 90 shown in FIG. 7 illustrates one possible buffer frame 102 (as defined by the addresses in these two segments). The inclusion of two segments 90 is merely illustrative of many possible sizings for the buffer frames 102, e.g., any multiple of the segments 90, based upon the data frames size. Moreover, the blocks 90 for a given data frame can be scattered randomly through the map portion 97. The number of memory segments 90 in the frame buffer 102 is based on the data frame's size. When the data frame is being received, it will keep using frame buffers until the entire frame is received (these are preallocated). It will be obvious to those skilled in the art that any scheme for dynamically changing the number of segments 90 per frame buffer 102 is within the scope of this invention.

In this second method, the memory segments 90 have a predetermined fixed size, which, in the preferred embodiment, are the sizes previously described with respect to FIGS. 6 and 7. Hence, FIG. 6 can also be used to explain this second method. As will become apparent from the following description, the fixed size segments 90 make the frame buffers 102 easier to manage in allocation routines 100 of FIG. 7. In the preferred implementation of this method, the size of the memory segments 90 are placed on convenient memory boundaries, such as the start of every 512 byte area. However, this sizing is merely undertaken for convenience, and other sizing may be required for compatibility with some hardware and software.

In this second method, a data frame 50 can require many segments 90 to make up a frame buffer 102 to hold it. This can result in blocks of fast memory 80 in parts of the payload area. For example, a frame buffer 102 may need two memory segments 90 to hold a given data frame 50, as shown in FIG. 7. However, in this example the header 78A can be contained in a single fast RAM memory block 92. In this example, the second fast RAM4 memory block 92 is used for the payload in the information field of the data frame 50. It will be obvious to those skilled in the art that any scheme for reallocating this fast RAM memory to be better used is within the scope of the present invention.

Since the buffer allocation routines 100 of FIG. 7 only are used to allocate buffer frames 102, the routines 100 are always able to allocate them with a size evenly dividable by the size of the fixed sized segment 90. Hence, all frame buffers 102 would automatically start at the beginning of a segment 90, as desired. Again, the segments 90 making up the frame buffers 102 are not necessarily contiguous, but can randomly be distributed through the map portion 97.

For the "interleave-by-decode" methods, using memory segments 90 and having a block of fast RAM memory 92 at the beginning of every memory segment 90, achieves substantial savings on memory cost. With the use of 32 byte blocks of fast RAM memory 92 at the beginning of every 512 byte segment 90, then the invention achieves only $\frac{1}{16}$th ($\frac{32}{512}$) as much fast memory as we would with all fast memory.

As previously mentioned, in this "interleave-by-decode embodiment", it is the address decoder 84 of FIG. 1 that allows for the interleaving of fast and slow memory in the memory map. In the preferred implementation of the interleave-by-decode method, the address decoder 84 comprises a programmable logic device (PLD). The specific PLD comprises a EP610EPLD from Altera Corporation. However, those skilled in the art will recognize that this decoding may also be implemented in discrete logic devices. The logic for the address decoder 84 is illustrated in FIG. 8.

Figure 8:
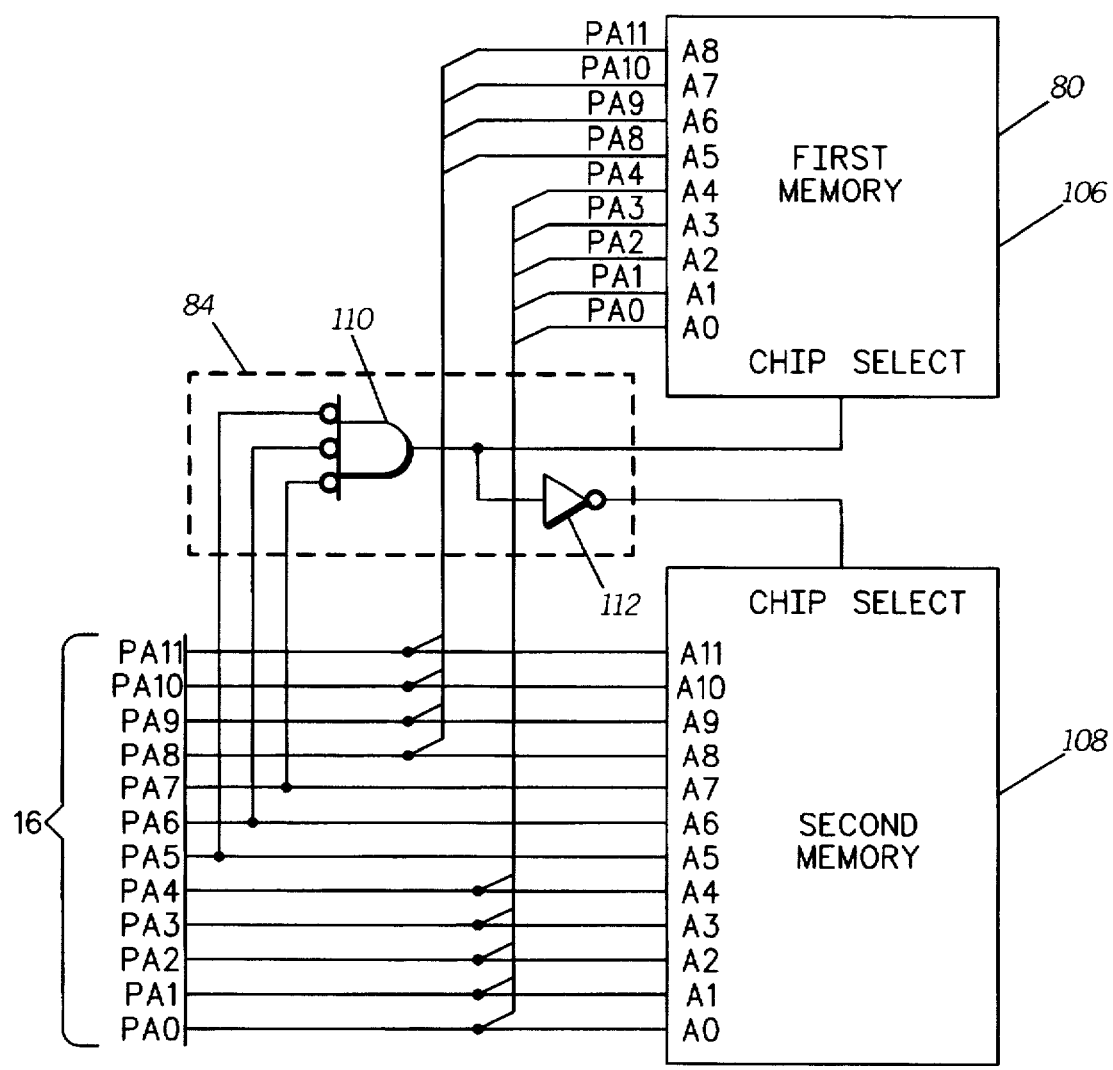
FIG. 8 is a schematic drawing of a simplified address decoder and memory layout for the interleave-by-decode embodiment of the present invention.
Figure 9:
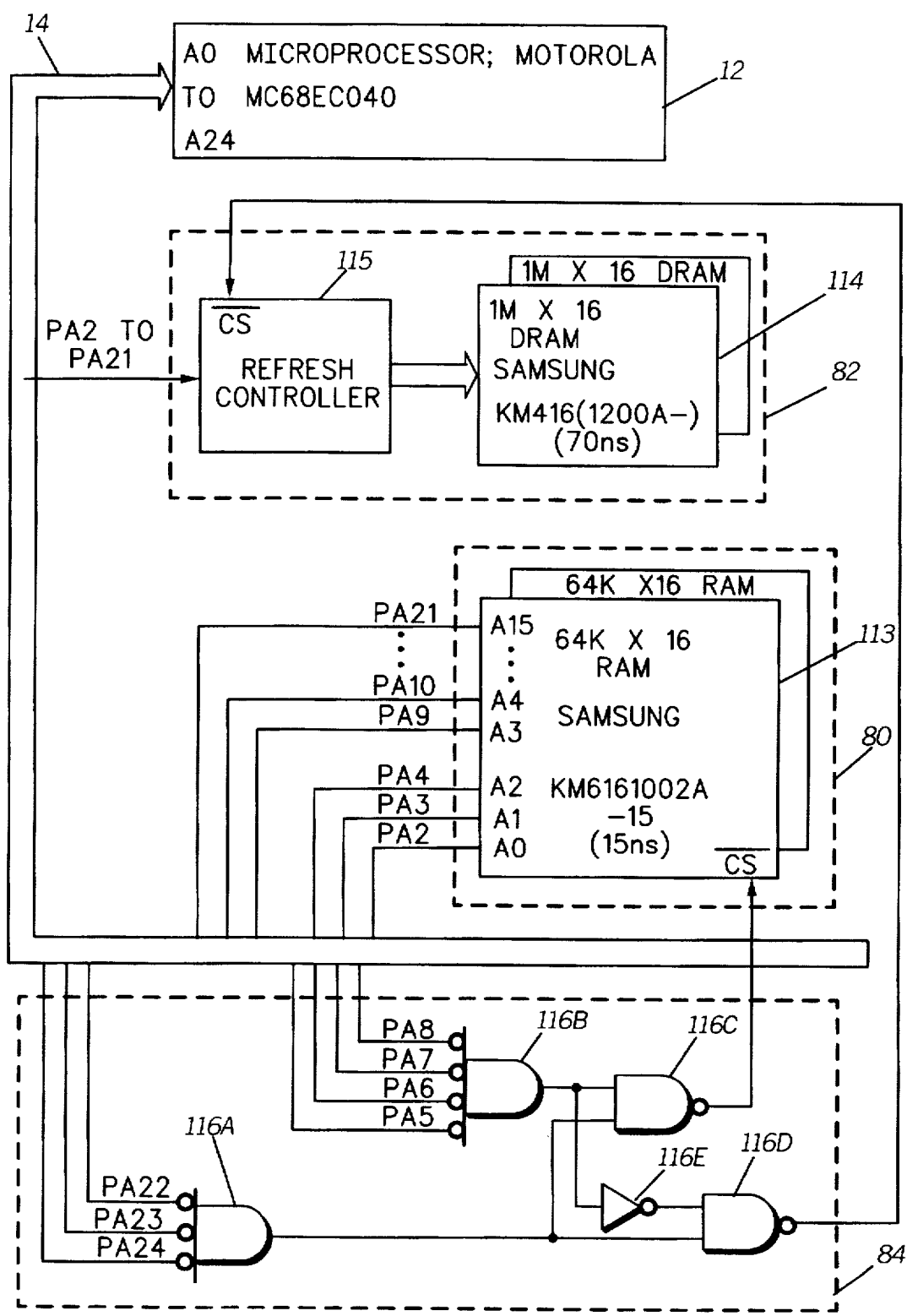
FIG. 9 is a schematic drawing of the address decoder and layout of the memory chips for the preferred interleave-by-decode embodiment of the present invention.

In FIG. 8 a simplified memory chip/decoder arrangement is shown to help explain the subject invention. The more complex memory chip/decoder arrangement actually used in the preferred embodiment is shown in FIG. 9. Referring to FIG. 8, a memory chip 106 is shown to illustrate one of a plurality of memory chips comprising the first memory 80. A second memory chip 108 is shown to illustrate one of a plurality of memory chips of the second memory 82. This decoder 84 is simplified for the purpose of illustration in that in the preferred embodiment there would be a plurality of both the chip 106 and the chip 108 and the conventional refreshing circuitry for the Dynamic RAM of chip 108 is not shown. In the preferred embodiment for a 32 bit processor system, the second memory 82 includes two 16 bit wide slow DRAMs. Address lines PA0 through PA11 comprise part of the address bus 16 of FIG. 1 which allow communications between the processor or the SCC/DMA controller (not shown in FIG. 8) and the memories 80 and 82. The address decoder 84's logic includes a three input NAND gate 110 having three of the inputs from the three address lines PA5 through PA7. If any of the three inputs are low, the output of the NAND gate 110 would be high. The output of the NAND gate 110 is fed to the chip select input of the memory chip 106. A high output from the NAND gate 110 to the select input of the memory chip 106 enables the memory chip 106 (whereas a low input disables the chip 106). The high output from the NAND gate 110 also is fed through an inverter 112 to the chip select input of the memory chip 108. This high output from the NAND gate 110 creates a disabling signal for the memory chip 108 (whereas a low output from the NAND gate 110 enables the chip 108). In this manner, depending upon the address on the address bus 16, only one of the memory chips 106 or 108 will be enabled at any given time. As is well known to those skilled in the art, two (one for each memory) or more address decoders can be used to accomplish the function of the single decoder 84.

Referring to FIG. 8, with respect to memory chip 106, memory inputs A0 through A8 are shown. With respect to second memory chip 108, memory locations or cells A0 through All are shown. Each of the addresses shown in the memory map of FIG. 6 are fed over the parallel address lines PA0 through PA11 (one bit per Line of a 12 bit address). The address bits PA5 through PA7 determine which one of the chips 106 and 108 that are enabled. For the purposes of explanation, the arrangement for the memory chips in FIG. 8 was simplified to that for an 8 bit processor, since one skilled in the art may readily extend this arrangement to the 32 bit processor of the preferred embodiment. Nevertheless, in FIG. 9 a block diagram of the memory chip arrangement is illustrated for the 32 bit processor of the preferred embodiment.

Referring to FIG. 1, the unique aspect about the address decoder 84 is that it allows for a memory map 88 of FIG. 7 to have multiple blocks of memory from multiple memory chips (i.e. slow and fast) interleaved in the memory map. Normally, in conventional designs all of the memory locations from one memory chip would reside in one continuous block in the memory map and those from another chip would reside in another separate, single continuous block.

Referring to FIG. 9, this Figure provides more detail than shown in FIG. 1 for the first and second memories 80 and 82 of the preferred embodiment. However, FIG. 9 only shows details pertainant to the subject invention and all other details such as connection of data bus and control signals are as in conventional processor/memory designs and are well known in the industry. The first memory 80 uses two 64 k×16 RAM memory chips 113, manufactured by Samsung (KM6161002A-15)(15 ns) and the memory 82 uses two 1M×16 DRAM memory chips 114, manufactured by Samsung (KM416C1200A) (70 ns). Hence, 4 Mega bytes of second memory 82 are provided and 256k Bytes of first memory 80 are provided. This memory arrangement provides the previously described 32 bytes of fast memory out of every 512 bytes of slow memory.

The data bus 14 for the processor 12 is 4 bytes wide, i.e., 32 bits wide. The second memory 82 has conventional refresh controller circuits 115, which provides multiplexed address to the DRAMs. With respect the the processor's addresses A0 to A24, both the first and second memories 80 and 82 are addressed by addresses PA2 to PA21. With the two fast RAM memory chips 113, the address and chip select signals are attach to the same signals on both chips, although in FIG. 9 they are shown connected only to the first.

The address decoder 84 includes the following components. A three input NOR gate 116A is used as a conventional address range decoder, i.e., it is used to map the segments into the lower 4 MByte address space of the processor 12. The rest of the logic gates make up the rest of the address decoder 84 and include a four input NOR gate 116B, two input NAND gates 116C and 116D and an inverter 116E. This generates the active low chip select for the first memory 80 and the active low chip select for the second memory 82.

The DRAM design of the memory chips 114 is a conventional one, although the active low DRAM chip 114 select signal from NAND gate 116D is an input to the refresh controller 115. This allows for an address range decode that is feed into the refresh controller 115. As with a conventional design, a read or write operation to the DRAM memory chip 114 only may occur for an address within the range assigned to the DRAM chips 114 by way of the address decoder 84.

Referring to FIG. 1. the SCC/DMA controllers 26 and 32 are of conventional design and shall not be described other than to provide the following overview. As previously mentioned, in the preferred embodiment, only the controller 26 is used to create frame buffers according to the present invention and not the controller 32. However, it is within the scope of the invention also to use the controller 32 to create such frame buffers. With the preferred embodiment, the controllers 26 and 32 comprises Motorola's MC68360 chips. Hereafter, only the SCC/DMA controller 26 is described, but it should be understood that this description would also describe controller 32, in the event that the subject invention is implemented with respect to the DTE side.

In a conventional manner, the SCC/DMA controller 26 has a table with "segment descriptors". The segment descriptors sizes and locates blocks of memory in the RAM memories 80 and 82 by including for each memory segment the following information: segment's status, data length and the data pointer. In a conventional manner, the SCC/DMA controller 26 has associated program routines which call the operating system 98 of FIG. 7. Upon being called, the operating system allocates a number of memory segments for use by the SCC/DMA controller. Thereafter, in a conventional manner, these routines associated with the SCC/DMA controller load the segment descriptors for the allocated memory segments into the segment descriptor table for the SCC/DMA controller. Additionally, the associated SCC/DMA controller routines keep the segment descriptor table for the SCC/DMA controller stocked with memory segments for creating the frame buffers 102. The associated SCC/DMA controller routines, as needed, will make calls to the operating system to obtain additional memory segments or to release release memory segments.

In applying the conventional DMA/SCC controller 26 to the present invention, the controller's table contains multiple segment descriptors, each of which points to a 256 byte memory block. For incoming data frames, the controller 26 automatically uses the next segment descriptor to access the next available 256 byte memory block used to store the incoming data frame. As previously mentioned, these memory blocks are obtained by calls to the buffer allocation routines. The SCC portion of the controller 26, upon detecting the start sequence of an incoming data frame, uses the DMA portion of the controller 26 to store the frame into memory. The DMA portion of the controller uses the next available 256 byte segment pointed to by the next segment descriptor in the segment descriptor table. The selection of the 256 byte memory block, as opposed to another size block, is just a configuration parameter for the allocation routines of the operating system. It is fixed to a predetermined size in the preferred embodiment for the interleaving by decode.

In the first method for interleave-by-decode, the frame buffers are always the same 256 byte size (defined by a single memory segment). However, in the second method for interleaving by decoding, the buffer frame can comprise a plurality of 256 byte blocks (defined by a multiple number of segments). For the second method, the controller 26 accomplishes this in the following way. If the incoming data frame fits within a single 256 byte block (one segment), then an interrupt is generated to the operating system when the end of the data frame is received. The information on where the frame processing routines (resident in the controller 26) can find the data frame in memory is provided in the segment descriptor. If the data frame is larger than 256 bytes, then the controller 26 automatically uses another 256 byte memory block which is pointed to by the next available descriptor in the table. The controller 26 continues to do this until the entire data frame is stored. When the end of the data frame is received and detected by the controller 26, an interrupt is generated to the operating system. The information on where the processor 12 can find the data frame in multiple memory blocks is provided in the segment descriptors in a conventional manner. More specifically, the table uses standard SCC/DMA segment descriptor operation and chaining. The table is set up as a circular queue, i.e., after the last segment descriptor is used, the first segment descriptor is used.

The DMA controller 26 keeps its table filled with sufficient segment descriptors for 256 byte memory blocks by automatically generating interrupts to the operating system when the number of available memory blocks get low. The interrupt causes more calls to the buffer allocation routine of the operating system to make more 256 blocks available to the controller.

With the second method, when there is a data frame that is stored in multiple 256 byte buffers, this frame is passed to different routines by the way of a linked list of the segment descriptor's information that points to where the data frame is in memory. This is a common software structure that is an ordered list of pieces (memory buffer areas) that when linked together form a whole item (in this case the successive multibyte blocks of a received frame). This linked list is used in processing the data frame through the various software layers of the frame relay applications.

Figure 10:
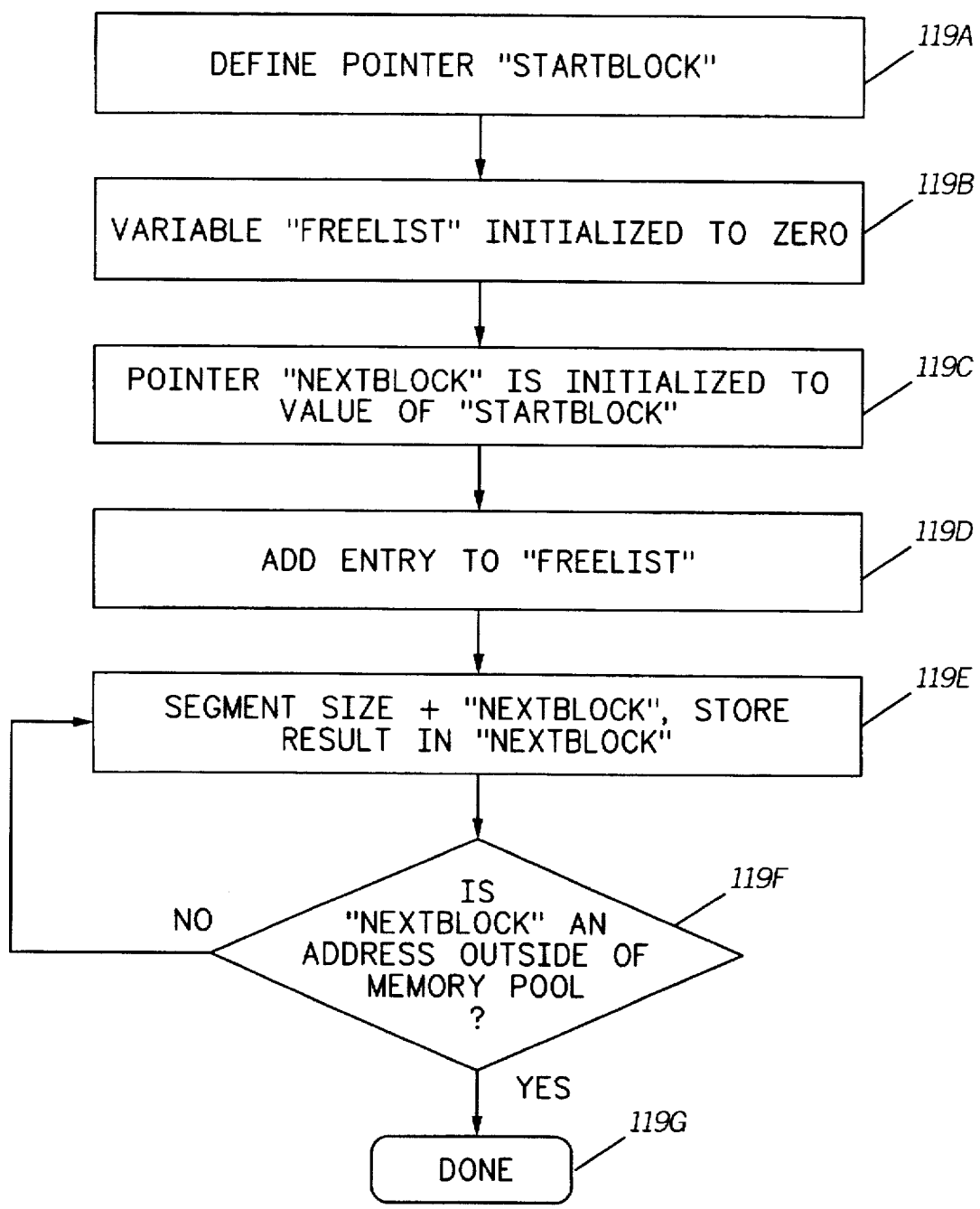
FIG. 10 is a flow chart of the modifications to the operating system for the interleave-by decode embodiment of the present invention.

Referring to FIG. 10, the modifications of the previously described operating systems are shown. At step 119A a software constant, "startblock" is defined. This constant is a pointer and its value is defined as the address of the start of the first segment 90 (shown in FIGS. 6 and 7). For the memory map of FIG. 6, this value would be 0. For the memory map of FIG. 7, it would be the address of the first location in the second pool 97 of memory, i.e. adjacent to the map portion 96. Next, starting at step 119B, a linked list of free, or unused segments 90 is built, which is called "freelist". This list comprises a list of unused segments 90 from the second pool 97, which are used by the buffer allocation routines 100 of FIG. 7. This "freelist" is created as follows. At step 119B, the linked list variable "freelist" is initialized to be empty. At step 119C, a pointer, "nextblock", is initialized to the value in "startblock" (e.g. points to start of the second pool 97). At step 119D, an entry to the end of the linked list "freelist" is added. This entry contains the value in the pointer "nextblock", i.e., this list entry points to that block. At step 119E, the value that is equal to the size of segment 90 is added to the value in "nextblock" and the result is stored in "nextblock". If the value in "nextblock" is an address outside of the address range of the second pool 97, then go to step 119G and the operation is done. If the value in "nextblock" is not an address outside of the address range of the second memory pool 97, then go back to step 119E. The linked list contains pointers to all the free segments 90 in the memory pool 97. Thereafter, standard linked list operations in the allocation routines 100 of FIG. 7 are used. When the allocation routines needs a free segment, the routine removes one from the linked list. In the preferred embodiment, this is accomplished by removing it from the end of the list. Removing it from the list provides the requesting process the address of the segment as well as its fixed size. When the routines 100 are done with the segment, the routines 100 return it for reuse by adding it to the end of the linked list. In this implementation, the length of the segment 90 is a constant. Hence, the free segment pool, accessed through the linked list data structure "freelist", thus provides segments, for used in storing data frames, that start at the beginning of memory segments 90.

Referring to FIG. 1, in summary this interleave by decode embodiment, the processor 12, in combination with the address decoder 84 and the SSC/DMA controller 26, forms a controller means 119 in the preferred embodiment. The controller means 119, upon receipt of one of the data frames, allocates at least a part of said headers to the first memory 80 and the payloads to the second memory 82. Although in the preferred embodiment the controller means 119 uses the SSC/DMA controller 26 (to be described hereinafter), in conjunction with the operating system of the microprocessor 12, to read and write to the memories 80 and 82, there are many other possibilities. The microprocessor 12, with its operating system, could undertake this task without the use of the SSC/DMA controllers. Alternatively, the packet engine 10 may rely solely a bus master, such as the SCC/DMA controller 26 to take control of the bus and do reads or writes to the memories 80 and 82. In addition to the SCC/DMA controller, this bus master may comprise, for example, a second microprocessor, a math coprocessor, a data compression chunk or hardware or like device. Those skill in the art well appreciate that the controller means 119 can take many different forms.

Referring to FIG. 1, for certain LAN applications and other applications providing packet frames or data frames, the SCC/DMA controller 32 could be used in the same manner as the SCC/DMA controller 26 to store the headers in the first memory 80 and the rest of the frames in second memory 82. Hence, although SCC/DMA controller 26 is shown as being part of the invention, either controllers 26 or 32 or both controllers 26 and 32 may be part of the controller means 119.

Although the subject invention is described as writing to memories 80 and 82, reading from memories 80 and 82 works in the same, but reverse manner. Data frames may be assembled by accessing the header in first memory 80 and the remainder of the data frame from the second memory 82 and then the data frame is reassembled.

In summary, referring to FIGS. 1 and 7, the controller means 119 has two main functions and therefore can be characterized as having: 1) allocating means (e.g., address decoder 84) for defining the first memory 80 to have a plurality of first memory blocks 92 and said second memory 82 to have a plurality of second memory blocks 94 and 2) storing means (e.g., controllers 26 and/or 32 and/or the microprocessor 12 with its operating system) for storing at least a portion of the header in one of the first memory blocks 92 and the rest of the data frame in at least one of the second memory blocks 94. However, those skilled in the art will recognize that these functions may be accomplished by a number of alternative arrangements.

Interleave-by-Pointer

The interleave-by-pointer embodiment, as described hereinafter, is an alternative embodiment to the above described interleave-by-decode embodiment. Referring back to FIG. 1, this embodiment steers bytes of the header of the data frame (or most of the header), as the data frame is received, into fast memory 80 and steers the bytes of the payload of the data frame into slower memory 82.

This embodiment uses the previously described SCC/DMA controllers 26 and 32 (Motorola's MC86360) shown in FIG. 1, but with some modification to the microcode as it exists from its manufacturer, Motorola. Referring to FIG. 1, the two controllers 26 and 32 each are represented by the SCC/DMA controller 120, in that both are the same.

Figure 12:
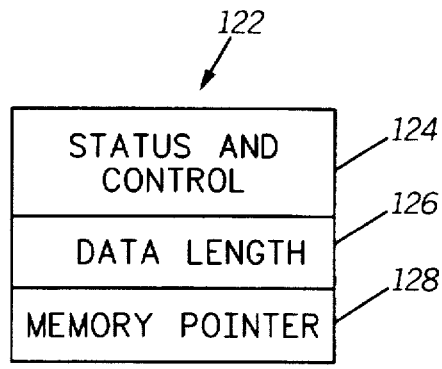
FIG. 12 is a block illustration of a segment descriptor for the SCC/DMA controller of the interleave-by-pointer embodiment of the present invention.
Figure 13:
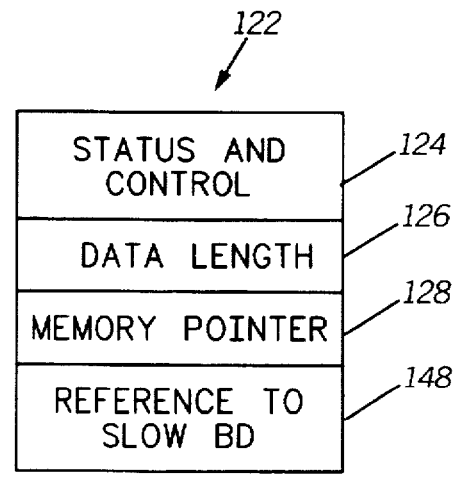
FIG. 13 is a block illustration of a modified segment descriptor for the SCC/DMA controller of the interleave-by-pointer embodiment of the present invention.

Referring to FIG. 12, as provided in the commercial MC68360 chip, a plurality of memory blocks are each identified by a segment descriptor 122. These segment descriptors 122 are organized into a table, with the table forming a circular queue with a programmable length. Each segment descriptor 122 contains: (a) status and control word 124, (b) data length of the data referenced by the segment descriptor 126, and (c) a 32-bit address pointer 128 that points to the block of memory which the segment descriptor 122 describes. It should be understood that each segment descriptor describes only a single block of memory. It may take several of these blocks of memory (one of them being from fast memory 80 and the rest from slow memory 82) to store an entire data frame. All the memory blocks which are needed for storing the entire data frame are referred to as the "frame buffer", as with the first embodiment. Hence, a "segment" descriptor do not describe the entire "frame buffer", but just one of the memory blocks in the frame buffer. If the frame buffer requires one block of fast memory and two blocks of slow memory, then three segment descriptors would be needed to define the frame buffer.

Figure 11:
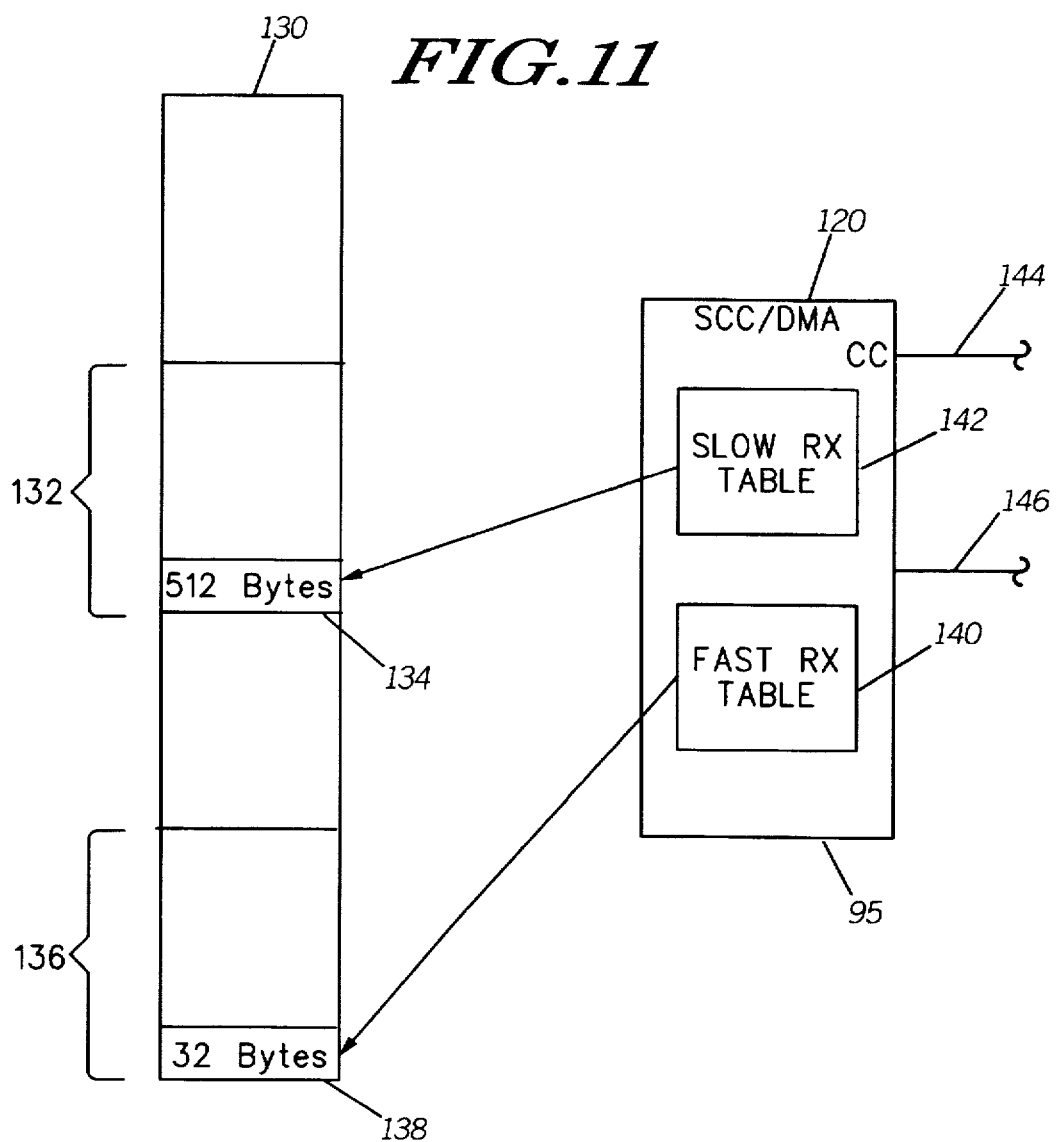
FIG. 11 shows how the SCC/DMA controller of the interleave-by-pointer embodiment of the present invention allocates memory.

Referring back to FIG. 11, a memory map 130 is shown having a first map portion 132 which comprises a first pool of slow blocks 134 of slow second memory 82 (shown in FIG. 1). Only a single 512 byte block 134 is shown in FIG. 11. The memory map 130 also includes a second map portion 136 comprising a second pool of fast blocks 138 of fast first memory 80 (shown in FIG. 1). Only a single 32 byte block; 134 is shown in FIG. 11. For receiving the data frames, the SCC/DMA controller 120 is modified in the present invention to have two tables instead of the previously mentioned one table. These two tables include a fast RX table 140 and a slow RX table 142, each of which have segment descriptors 122 just as described with respect to FIG. 12. Each of the segment descriptors 122 contained in the fast table 140 has memory pointers 128 pointing to the fast blocks 138 of memory. The slow table 142 has memory pointers 128 pointing to slow blocks 134 of memory.

Hence, the two tables 140 and 142 provide the SCC/DMA controller 120 with two pools of memory blocks for receiving data frames, with table 142 being used for the fast, small memory blocks for header of the data frame and table 140 being used for slow, bigger memory blocks for the payload of the data frame. More specifically, the DMA/SCC controller 120 would start with a fast memory block 138 with the start of a newly received data frame. In that the data frame does not all fit in this fast memory block 138, another memory block is requested. However, after the fast memory block 134 has been requested using fast table 140, all subsequent memory blocks requested for that data frame would be for slow memory blocks 134 using slow table 142.

Referring to Figure 11, when the receive side of the CC input of the controller 120 is enabled over line 144 (part of the control bus 18 shown in FIG. 1) by the microprocessor 12 shown in FIG. 1, the controller 120 starts with the first segment descriptor 122 in the fast table 140. Once data arrives from a serial line 146 into the controller (data frames coming from the port interface 28 or 20 in FIG. 1), the controller 120 performs certain required protocol processing on the data and moves the resultant data to the fast block 138 of memory pointed to by the first segment descriptor 122 in the fast table 140. Use of this segment descriptor 122 is complete when there is no more room left in the pointed-to memory block 138 or when certain events occur, such as detection of an error or an end of data frame. Whatever the reason, the memory block 138 is then determined to be closed by the controller 120, and additional data is stored using the next memory block 134 specified by the next segment descriptor 122 found in the slow table 142. Hence, in the present invention, the next segment descriptor is selected from the slow table 142. If the end of frame still has not been reached, the controller 120 uses the next available segment descriptor 122 in the slow table 142 to store the next portion of the received data frame. In this manner, additional slow memory blocks 134 would be selected until the end of frame is detected by the controller 120. Upon the detection of the end of frame, the controller 120 reverts back to the fast table 140 and uses the next available segment descriptor 122 in the fast table 140 to store the header (or most of it) of the next received frame and so on.

Referring to FIG. 1., one additional piece of information needs to be added to each segment descriptor 122 for the fast table 140, which includes the previously described status and control 124, data length 126 and memory pointer 128. This information comprises a reference 148 that indicates where the next segment descriptor 122 is located in the slow table 142 for that data frame, since this information cannot be found in the following segment descriptor 122 in the fast table 140. This is done by using eight of the data length bits 126. This redefines 8 of these bits, which would reduce the available maximum data length. However, this is acceptable. The 8 bits would reference one of the $2^8=256$ segment descriptors in the slow table (to be used next).

Whenever the controller 120 needs to begin using a segment descriptor 122 because a new data frame is arriving, the controller 120 checks the E-bit of the status and control word 124. If the current segment descriptor 122 is not empty, then a busy error will be continuously generated until it is empty. However, the controller 120 does not move from the current segment descriptor 122 until it becomes empty. When the controller 120 sees the W-bit of the status and control word 124 is set in the segment descriptor 122, it goes back to the beginning of which ever table 140 or 142 it is using after processing of the segment descriptor 122 is complete. With the control word, E means empty, e.g., does not have data in it from a previous received data frame that has not yet been released from the segment descriptor by the protocol processing routines resident in the controller 120. This is part of the standard circular queue processing.

Referring to FIG. 11, in this interleave by pointer embodiment, the controller means 119 comprises the SCC/DMA controller 120 and the microprocessor 12 with its operating system. However, in this embodiment the controller means 119 is not defined to include the address decoder 84 (shown in FIG. 1), since the address decoder 84 functions in a wholly conventional manner in this embodiment without the need for any special adaptions to allow the memory interleaving, as was required in the interleave by decode embodiment. The controller means 119, upon receipt of one of the data frames, allocates at least a part of the headers to the first memory 80 and the payloads to the second memory 82. As well be appreciated by those skilled in the art, the functionality of the controller means 119 may be shifted all to the operating system or all to the SCC/DMA controller.

The present invention may be implemented in a number of ways, as will be clear to those skilled in the art. Of course, those skilled in the art will appreciate that while this arrangement is preferred, it is not intended to be limiting as other arrangements of the frame are possible.

What is claimed is:

1. A frame processing engine for receiving and processing a plurality of data frames, each of said data frames having a header and a payload, comprising:

a first memory;

a second memory;

said first memory having a shorter access time than said second memory;

controller means including allocating means for defining said first memory to have a plurality of first memory blocks with each having the same predetermined first size and said second memory to have a plurality of second memory blocks with each having the same predetermined second size; said allocating means being further operable for defining a plurality of memory segments, each of said memory segments including one of said first memory blocks of said first memory and one of said second blocks of said second memory; and said controller means further including storing means for storing, upon receipt of said each data frame, said each data frame in a variable number of said memory segments with at least a portion of said header of said each data frame being stored in one of said first memory blocks, said variable number of said memory segments being dependent upon the size of said payload.

2. The frame processing engine of claim 1, wherein said controller means includes a microprocessor and at least one address decoder for enabling only one of said memories at a time.

3. The frame processing engine of claim 2, wherein said microprocessor includes a linear address space having a range of addresses, said addresses of said address space defining alternating first blocks of said first memory and second blocks of said second memory and said microprocessor being disposed to start the storage of each of said headers at the beginning of one of said first blocks.

4. The frame processing engine of claim 1, wherein said header includes a frame header and a packet header and said payload includes data.

5. The frame processing engine of claims 1, wherein said first memory comprises static RAM memory and said second memory comprises dynamic RAM memory.

6. A frame processing method for receiving and processing a plurality of data frames, each of the data frames having a header and a payload, said method comprising the steps of:

providing a first memory and a second memory with the first memory having a shorter access time than the second memory;

allocating said first memory to have a plurality of first memory blocks with each having the same predetermined first size and said second memory to have a plurality of second memory blocks with each having the same predetermined second size; said step of allocating further including defining a plurality of memory segments, each of said memory segments including one of said first memory blocks of said first memory and one of said second blocks of said second memory; and storing, upon receipt of said each data frame, said each data frame in a variable number of said memory segments with at least a portion of said header of said each data frame being stored in one of said first memory blocks, said variable number of said memory segments being dependent upon the size of said payload.

7. The frame processing method of claim 6, wherein said step of storing includes decoding an address to enable only one of the memories at a time.

8. The frame processing method of claim 7, wherein said step of storing includes providing a linear address space having a range of addresses, the addresses of the address space correlating with alternating first blocks of the first memory and second blocks of the second memory.

9. The frame processing method of claim 8, wherein the header includes a frame header and a packet header and the payload includes data.

10. The frame processing method of claim 9, wherein said step of providing the memories comprises providing a static RAM memory for the first memory and a dynamic RAM memory for the second memory.

11. A frame processing engine for receiving and processing a plurality of data frames, each of said data frames having a header and a payload, comprising:

a first memory;

a second memory;

said first memory having a shorter access time than said second memory;

controller means including allocating means for defining said first memory to have a plurality of first memory blocks and said second memory to have a plurality of second memory blocks; said allocating means including a first table and a second table; said first table including, for said each data frame, a first address pointer for pointing to at least one of said first memory blocks; said second table including, for said each data frame, a second address pointer for pointing to at least one of said second memory blocks; and said controller means further including storing means, upon receipt of said each data frame, for storing, based upon said first and second address pointers, at least a portion of said header of said each data frame in said at least one of said first memory blocks and the rest of said each data frame in said at least one of said second memory blocks.

12. The frame processing engine of claim 11, wherein said header is stored in a single said first memory block and said rest is stored in a variable number of said second blocks, said variable number being dependent upon the size of said payload.

13. The frame processing engine of claim 11, wherein, for said each data frame, said first table includes said first address pointer for only a single said first block and second table includes said second address pointer for a plurality of second blocks, the number of said plurality of second blocks being dependent upon the size of said payload.

14. The frame processing engine of claim 11, wherein said first memory comprises static RAM memory and said second memory comprises dynamic RAM memory.

15. The frame processing engine of claim 11, wherein said header includes a frame header and a packet header and said payload includes data.

16. The frame processing engine of claim 11, wherein said first table includes a plurality of first segment descriptors, each of said first segment descriptors having said first address pointer pointing to one of said first blocks and said second table includes a plurality of second segment descriptors, each of said second segment descriptors having said second address pointer pointing to one of said second blocks.

17. The frame processing method of claim 16, wherein said first segment descriptors in said first table for said data frame include a third pointer which is operable for pointing to one of said second segment descriptors in said second table for said data frame.

18. A frame processing method for receiving and processing a plurality of data frames, each of said data frames having a header and a payload, comprising the steps of:

providing a first memory and a second memory with the first memory having a shorter access time than the second memory;

allocating said first memory to have a plurality of first memory blocks and said second memory to have a plurality of second memory blocks; said step of allocating further including defining a first table and a second table; said first table including, for said each data frame, a first address pointer for pointing to at least one of said first memory blocks; said second table including, for said each data frame, a second address pointer for pointing to at least one of said second memory blocks; and upon receipt of said each data frame, storing, based upon said first and second address pointers, at least a portion of said header of said each data frame in said at least one of said first memory blocks and the rest of said each data frame in said at least one of said second memory blocks.

19. The frame processing method of claim 18, wherein said step of storing includes, for said each data frame, using the addresses of the first table to store the header in only one of the first blocks and using the addresses of the second table to store the remainder of the data frame in a plurality of the second blocks, the number of the plurality of the second blocks being dependent upon the size of the payload.

20. The frame processing method of claim 19, wherein said step of storing includes providing the first table and the second table each with first and second segment descriptors, respectively; using a first address pointer of each first segment descriptors to point to one of the first blocks and using a second address pointer of each second segment descriptors to point to one of the second blocks.

21. The frame processing method of claim 20, wherein said step of storing includes providing each of said first segment descriptors in said first table for said data frame with a third pointer which points to one of said second segment descriptors in said second table for said data frame.

* * * * *